(12) United States Patent
Marinet et al.

(10) Patent No.: US 9,323,941 B2
(45) Date of Patent: Apr. 26, 2016

(54) SECURE METHOD FOR PROCESSING A CONTENT STORED WITHIN A COMPONENT, AND CORRESPONDING COMPONENT

(75) Inventors: Fabrice Marinet, Chateauneuf le Rogue (FR); Mathieu Lisart, Aix en Provence (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 782 days.

(21) Appl. No.: 12/942,557

(22) Filed: Nov. 9, 2010

(65) Prior Publication Data

US 2011/0113256 A1 May 12, 2011

(30) Foreign Application Priority Data

Nov. 12, 2009 (FR) ...................................... 09 57958

(51) Int. Cl.
*G06F 11/30* (2006.01)
*G06F 12/14* (2006.01)
*H04L 29/06* (2006.01)
*G06F 21/62* (2013.01)
*G06F 21/78* (2013.01)
*G06F 11/14* (2006.01)
*G06F 21/77* (2013.01)

(52) U.S. Cl.
CPC ............ *G06F 21/62* (2013.01); *G06F 11/1458* (2013.01); *G06F 21/77* (2013.01); *G06F 21/78* (2013.01)

(58) Field of Classification Search
CPC ..... G06F 12/1408; G06F 21/72; G06F 21/77; G06F 21/78; H04L 2209/12
USPC ................ 713/189–194, 167; 711/173, 103; 726/22; 380/28
See application file for complete search history.

(56) References Cited

U.S. PATENT DOCUMENTS

| 7,005,733 | B2 * | 2/2006 | Kommerling et al. ........ 257/679 |
| 7,117,372 | B1 * | 10/2006 | Trimberger et al. .......... 713/189 |
| 7,237,121 | B2 | 6/2007 | Cammack et al. |
| 7,401,361 | B2 * | 7/2008 | Freeman et al. ................ 726/22 |
| 7,441,068 | B2 * | 10/2008 | Pua et al. ...................... 711/103 |
| 8,145,900 | B2 * | 3/2012 | Launchbury et al. ......... 713/162 |
| 2003/0163717 | A1 * | 8/2003 | Yoshimoto et al. ........... 713/193 |
| 2005/0076226 | A1 | 4/2005 | Boivie et al. |

FOREIGN PATENT DOCUMENTS

| EP | 0961193 A2 | 12/1999 |
| EP | 1429224 A1 | 6/2004 |

OTHER PUBLICATIONS

Republique Francais, Institut National De La Propriete Industrielle, Rapport De Recherche Preliminaire (Preliminary Search Report), issued on Jul. 1, 2010 in France Patent Application No. FR 0957958 (2 pages).

* cited by examiner

*Primary Examiner* — Saleh Najjar
*Assistant Examiner* — Feliciano Mejia
(74) *Attorney, Agent, or Firm* — Slater & Matsil, L.L.P.

(57) ABSTRACT

The component comprises a first memory (MM) comprising a first portion (P1) having a content modified with a first modification entity (K1) and a second portion (P2) having a content modified with a second entity (K2), a storage means (MS) configured to store the first entity (K1) secretly, a non-volatile memory (NVM) storing an item of entity information representative of the second entity (K2) in a location (END) designated by a first indication (INDK2) contained in the said first portion of the first memory.

23 Claims, 14 Drawing Sheets

SECURE METHOD FOR PROCESSING A CONTENT STORED WITHIN A COMPONENT, AND CORRESPONDING COMPONENT

This application claims the priority benefit of French Patent Application 09-57958, which was filed Nov. 12, 2009 and is entitled "Secure method for processing a content stored within a component, and corresponding component," which is hereby incorporated by reference to the maximum extent allowable by law.

TECHNICAL FIELD

The invention relates to the protection of contents stored within a component, notably but not exclusively in the field of smart cards.

BACKGROUND

Currently, in order to clone or emulate a secure product such as for example an integrated circuit of a smart card, it is possible, with an average level of time, experience, number of samples and appropriate equipment, to carry out an invasive physical attack which is aimed at physically reading the encrypted content in a memory, for example a read-only memory, so as to extract therefrom a protected value representative of a confidential code for example, and to carry out a reverse engineering operation on the encryption/decryption logic circuit embedded in a logic set commonly called "glue logic" by those skilled in the art.

It then becomes possible to obtain the confidential code in clear.

SUMMARY OF THE INVENTION

In one aspect, the present invention provides for a method for processing content stored within a component, the component comprising a first memory and a non-volatile memory. The content of a first portion of the first memory is modified with a first entity and the content of a second portion of the first memory is modified with a second entity. The method comprises storing said first entity secretly in the component. The method further comprises storing an item of entity information representative of said second entity in said non-volatile memory in a location designated by a first indication contained in said first portion of the first memory.

In another aspect, the present invention provides for a component comprising a first memory including a first portion having a content modified with a first entity and a second portion having a content modified with a second entity. The component further includes storage means configured to store the first entity secretly, and a non-volatile memory storing an item of entity information representative of the second entity in a location designated by a first indication contained in said first portion of the first memory.

BRIEF DESCRIPTION OF THE DRAWINGS

Other advantages and features of the invention will appear on examination of the detailed description of modes of application and embodiments which are in no way limiting and of the appended drawings in which.

DETAILED DESCRIPTION OF ILLUSTRATIVE EMBODIMENTS

Figure 1:
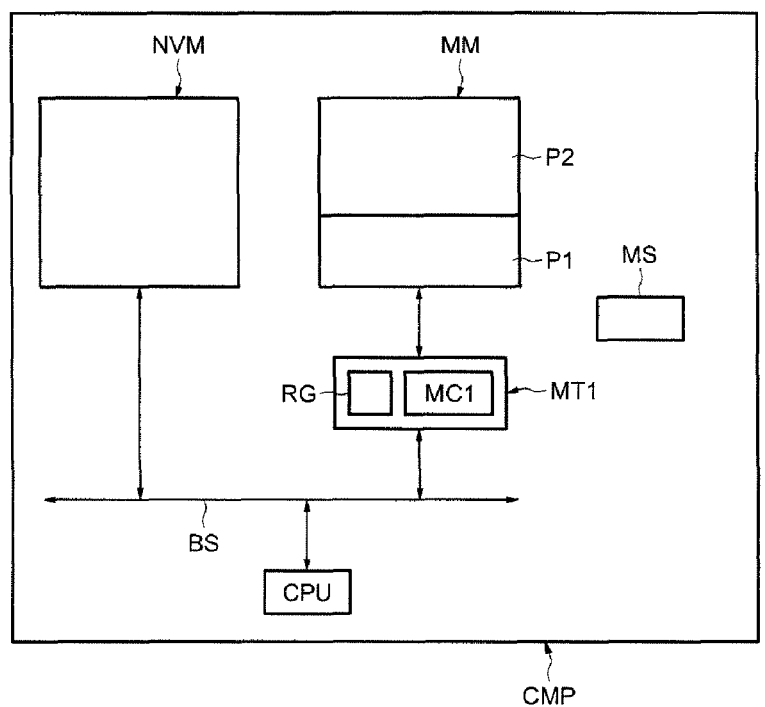
FIG. 1 illustrates schematically an embodiment of a component according to the invention.

Before describing specific embodiments in detail, various embodiments are described generally. This technique described herein can be applied to RAM memories the content of which can be read electrically (for example by means of the potential contrast method), as well as other memories.

According to one mode of application and embodiment, a method and a component are proposed that makes it possible to reinforce the protection of the component against an attacker who would like to clone or emulate such a component.

According to one aspect, a secure method for processing a content stored within a component is proposed; the component comprises a first memory, for example a ROM memory or a RAM memory and a non-volatile memory, for example an electrically programmable and erasable memory (EEPROM memory) or else a FLASH memory; the content of a first portion of the first memory has been modified with a first entity, and the content of a second portion of the first memory has been modified with a second entity.

The term "modified" should be understood here in a very broad sense covering notably an encryption and/or an operation commonly referred to as "scrambling" by those skilled in the art.

Similarly, the concept of "entity" must also be taken in a very broad sense, covering notably an encryption key and/or a scrambling key which will be able to be used respectively with encryption/decryption operations and scrambling/descrambling. An entity may also be formed of bits a portion of which may be used as bits for configuring a configurable logic circuit and of which another portion may form an encryption key that can be used as an input parameter of the encryption/decryption function used by the logic circuit configured by the configuration bits.

In the method according to this aspect, the said first entity, for example a first encryption/decryption key, is stored secretly in the component, and an item of entity information representative of the said second entity, for example a second encryption/decryption key, in the said non-volatile memory in a location designated by a first indication contained in the said first portion of the first memory.

According to one mode of application, an inverse modification process, for example a decryption process, is applied to the modified content of the first portion of the first memory by using the said first entity, then, after the said first indication is obtained with the said inverse modification process, the said second entity, for example the second encryption/decryption key, is obtained from the said item of entity information contained in the non-volatile memory and, an inverse modification process is applied to the modified content of the second portion of the first memory by using the said second entity.

Therefore, according to this aspect, provision is made to store important items of information, for example an encryption key, in a third element, namely a non-volatile memory. And, if for example a confidential code is stored in an encrypted manner in the second portion of the first memory, for example a ROM memory, with the second encryption key which is itself stored in the non-volatile memory, the attacker must make a physical invasive attack on three elements instead of two in the prior art, namely on the first memory, on the non-volatile memory and on the decryption logic.

The protection of the component is consequently strengthened.

Moreover, the protection is also strengthened by the fact that the content of the first memory is encrypted with two different keys, the second key for its part not being contained in this memory but in another memory, namely the non-volatile memory, and its location (the address or the addresses) is designated by an indication encrypted by the first key and contained in the first memory.

Furthermore, this protection against possible attacks is yet more effective when the non-volatile memory is a non-volatile memory that is at least electrically programmable, for example an EPROM memory, and preferably an electrically programmable and erasable memory such as an EEPROM memory or a FLASH memory.

Specifically, an invasive physical attack on a non-volatile memory that is at least electrically programmable, and more particularly an EEPROM memory or a FLASH memory, is extremely difficult and completely different from a physical attack on a ROM memory.

According to one mode of application, the said item of entity information may be the second entity itself In other words, in this case, the second entity, for example an encryption/decryption key, is stored in clear, that is to say in an unencrypted manner in the non-volatile memory.

As a variant, the said item of entity information may be the second entity modified with the first entity. In other words, the said item of entity information, which is stored in the non-volatile memory, is in this case for example the second key encrypted with the first key. In such a mode of application, which is more robust in the matter of security than the foregoing, after having obtained the said first indication, an inverse modification process is applied to the said modified item of entity information by using the first entity so as to obtain the said second entity.

In other words, if the entities are encryption keys, after the first indication is obtained, that is to say the indication of the location where the key information is stored in the non-volatile memory, the second key stored in an encrypted manner in the non-volatile memory is decrypted with the aid of the first key so as to obtain the second key in clear.

In one mode of application that is yet more secure, it is possible to have the non-volatile memory possess a first portion in which the said item of entity information (that is to say for example the second key in clear or the second encrypted key) and a second portion the content of which has been modified with a third entity, for example a third encryption key, are stored. Then, the third entity modified with the said second entity (for example the third key encrypted with the second key) is stored in the second part of the first memory and after an inverse modification process is applied to the said third modified entity (for example a decryption) by using the second entity (for example the second encryption key), an inverse modification process (for example with a decryption process) is applied to the modified content of the second portion of the non-volatile memory by using the third entity (for example the third encryption key).

Therefore, in this mode of application, the third encryption key which makes it possible to decrypt the second portion of the non-volatile memory, containing for example highly secure data, is not in the non-volatile memory itself, but in the first memory in a form encrypted with the aid of the second key which is also not in the first memory but in the non-volatile memory. Therefore, in this instance a sort of crossed storage is carried out of the keys in the two memories and at least one of the keys (the third encryption key) is itself stored in an encrypted manner with another encryption key.

At least one of the entities may comprise an encryption key and the associated inverse modification process comprises a decryption process.

As a variant, instead of using an actual encryption tool, it is possible to use a scrambling process. In this case, at least one of the entities may comprise a scrambling key and the associated inverse modification process comprises a descrambling process.

Naturally, the two modes of application are not incompatible. Therefore, at least one of the contents may have been both encrypted with an encryption key and scrambled with a scrambling key, and the associated inverse modification process then comprises a decryption process and a descrambling process. The order of these processes is the inverse of the order of the encryption and scrambling processes.

According to another aspect, a component is proposed comprising
- a first memory comprising a first portion having a content modified with a first modification entity and a second portion having a content modified with a second entity,
- a storage means configured for storing the first entity secretly,
- a non-volatile memory storing an item of entity information representative of the second entity in a location designated by a first indication contained in the said first portion of the first memory.

According to one embodiment, the component comprises:
first processing means capable of applying an inverse modification process to the modified content of the first portion of the first memory,
second processing means capable of applying an inverse modification process to the content of the second portion of the first memory,
control means capable of first activating the first processing means with the first entity, then in order to obtain, after inverse modification processing on the said first indication with the said first entity, the second entity from the said item of entity information contained in a non-volatile memory and in order to activate the second processing means with the second entity.

The said item of entity information may be the second entity or the second entity modified with the first entity.

In the latter case, and according to one embodiment, the component also comprises auxiliary processing means that are structurally identical to the first processing means and capable of applying an inverse modification process to the said item of entity information, and the control means are also capable, after having obtained the said first indication, of activating the auxiliary processing means with the first entity in order to obtain the said second entity.

Although the first and second processing means may be structurally different, in practice, and for reasons of simplicity of production, they are preferably structurally identical.

According to one embodiment allowing in particular a crossed storage of the entities, the non-volatile memory comprises a first portion storing the said item of entity information, and a second portion having a content modified with a third entity, the second portion of the first memory storing the third entity modified with the said second entity; the component also comprises a third processing means capable of applying an inverse modification process to the modified content of the second portion of the non-volatile memory, and the control means are also capable of activating the third processing means with the third entity delivered by the second processing means.

Here again, for reasons of simplicity, the third processing means are usually structurally identical to the first and second processing means, although they may be different.

According to one embodiment, at least one of the entities comprises an encryption key and the associated processing means is configured in order to use a decryption algorithm with key, for example an algorithm of the DES or AES type.

According to another embodiment, at least one of the entities comprises an encryption key and the associated processing means comprises a logic circuit that can be structurally configured with the aid of at least one portion of the encryption key.

Such an embodiment makes it possible in particular to apply the decryption in a clock cycle of a clock signal delivered to a processor unit on board the component.

According to another embodiment, at least one of the entities comprises a scrambling key and the associated processing means comprises an additional circuit configured in order to apply a descrambling operation.

Naturally, as indicated above, at least one of the entities may comprise an encryption key and a scrambling key and in this case the associated processing means comprise both a circuit capable of applying a decryption and an additional circuit capable of applying a descrambling operation.

According to an embodiment which is particularly robust from the security point of view, the non-volatile memory is a memory of the electrically programmable and erasable type or a memory of the FLASH type.

According to another aspect, a smart card is proposed containing a component as defined above.

According to FIG. 1, the reference CMP indicates an electronic component made for example in the form of an integrated circuit, and comprising a first memory MM, for example a read-only memory (ROM memory) or else a random-access memory (RAM memory).

This first memory comprises a first portion P1 and a second portion P2.

The component also comprises a non-volatile memory NVM, for example an EEPROM memory.

Also provided is a storage means MS, for example registers, intended, as will be seen below, for storing secretly, that is to say for example permanently, a first entity such as a first encryption/decryption key.

The component also comprises first processing means MT1, to which we will return in greater detail below on the structure and functionality, coupled between the memory MM and a bus BS to which is also connected a processor unit, such as a microprocessor or a microcontroller, CPU. The CPU unit may incorporate a control software module capable of activating the processing means MT1.

The non-volatile memory NVM is also connected to the bus BS so that all of these elements CPU, NVM, MM can exchange information.

In general, the content of the first portion P1 of the memory MM has been modified with a first entity and the content of the second portion P2 of the first memory has been modified with a second entity.

In the embodiment and mode of application that will now be described, it is assumed, for the purposes of simplification, that the modification results from an encryption, the first entity then being an encryption key K1 and the second entity an encryption key K2. In this case, the processing means MT1 are capable of applying a decryption process and comprise a register RG designed to store the decryption key (which is also the encryption key) and computing means MC1 capable for example of using a decryption algorithm, for example of the AES (Advanced Encryption Standard) or DES (Data Encryption Standard) type.

Figure 2:
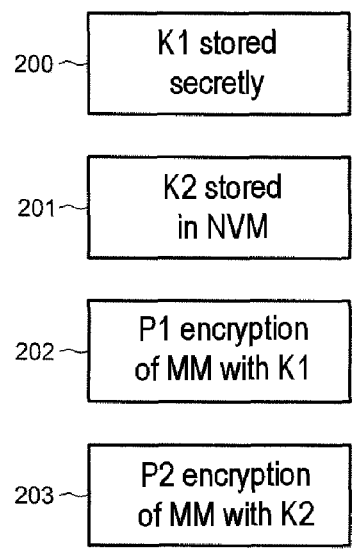
FIGS. 2 to 6 illustrate schematically a mode of application of a method according to the invention.

Referring now to FIG. 2, it can be seen that the key K1 is stored secretly (step 200) in the storage means MS. It is for example a permanent storage in a protected memory means, such as one or more registers for example. The value of the key K1 may also for example be the secret value for resetting a protected register.

Moreover, the key K2 has been stored in a location in the non-volatile memory NVM (step 201).

And, as indicated above, the content of the first portion P1 of the memory MM has been encrypted with the key K1 (step 202) while the content of the second portion P2 of the memory MM has been encrypted with the key K2 (step 203).

The second portion P2 of the memory MM may comprise protected user data, for example a confidential code.

The first portion P1 of the memory MM for its part comprises booting instructions so as to allow the device to start when the component is powered up.

Figure 3:
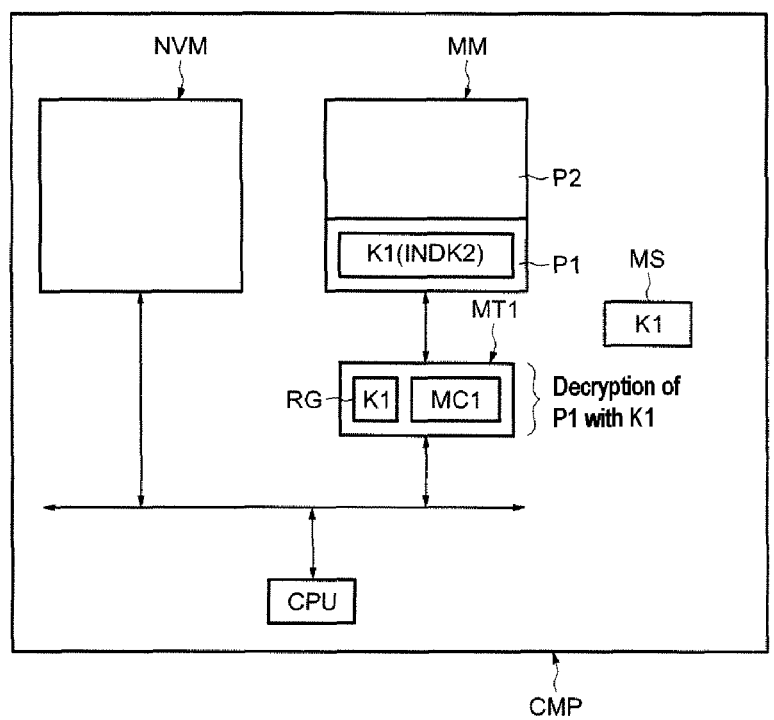

Therefore, as illustrated in FIG. 3, when the component is powered up, the decryption means MC1 use the key K1, that has been shown here in the register RG, and begin to decrypt the content of the portion P1 of the memory MM with the key K1.

In this portion P1 of the memory MM has been stored, encrypted by the key K1, an indication INDK2 designating the location in the non-volatile memory NVM in which the second key K2 is stored.

In general, this location may be an address or if necessary several addresses, which may or may not be contiguous, of the memory NVM. Specifically, the key K2 may be stored at a precise address or at several different addresses in the event, for example, that this key consists of several bytes.

Figure 4:
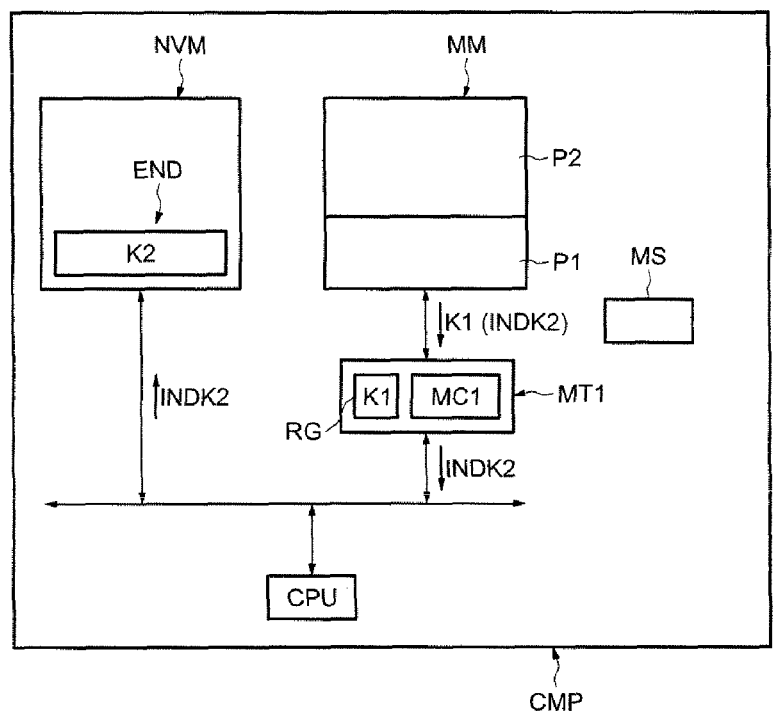

When the encrypted indication K1 (INDK2) is decrypted by the first processing means MT1, this indication INDK2 allows the processor unit CPU (FIG. 4) to address the non-volatile memory NVM at the address designated by this indication INDK2.

As a result, the key K2 stored in the location END designated by the address INKD2 is extracted from the memory NVM (FIG. 4) in order to be stored finally in the register RG of the first processing means MT1.

Figure 5:
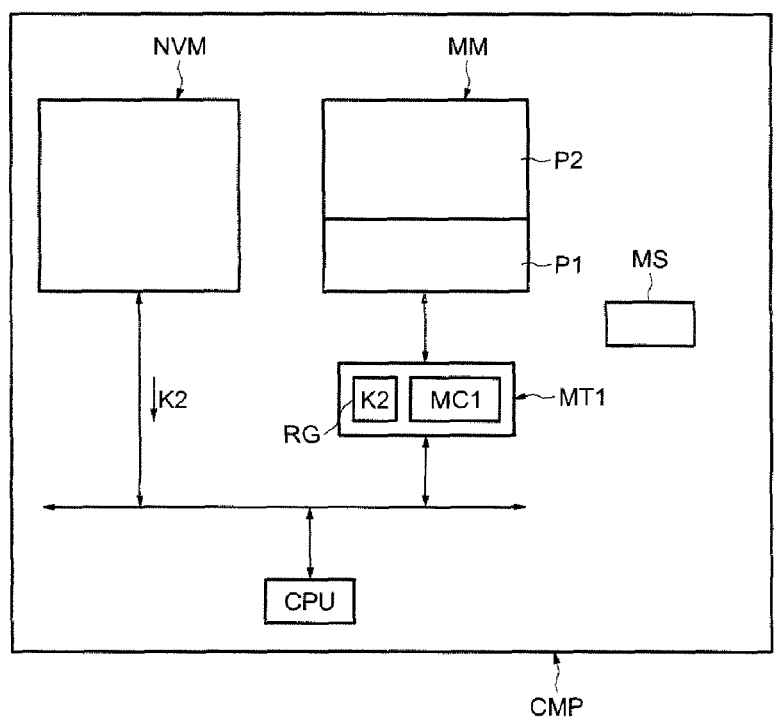

Specifically, in FIG. 5, for purposes of simplification, all that is shown is a single register RG. In practice, it is possible to arrange to store the key K2 in a temporary register so that the processor CPU can if necessary continue to extract data from the first portion P1 of the memory via the means MT1 using the key K1 during the transfer of the key K2. And it is simply only when all the bytes of the key K2 have been stored in the temporary register that the key K2 can replace the key K1 in the register RG so as to allow the processing means to switch to the key K2.

Figure 6:
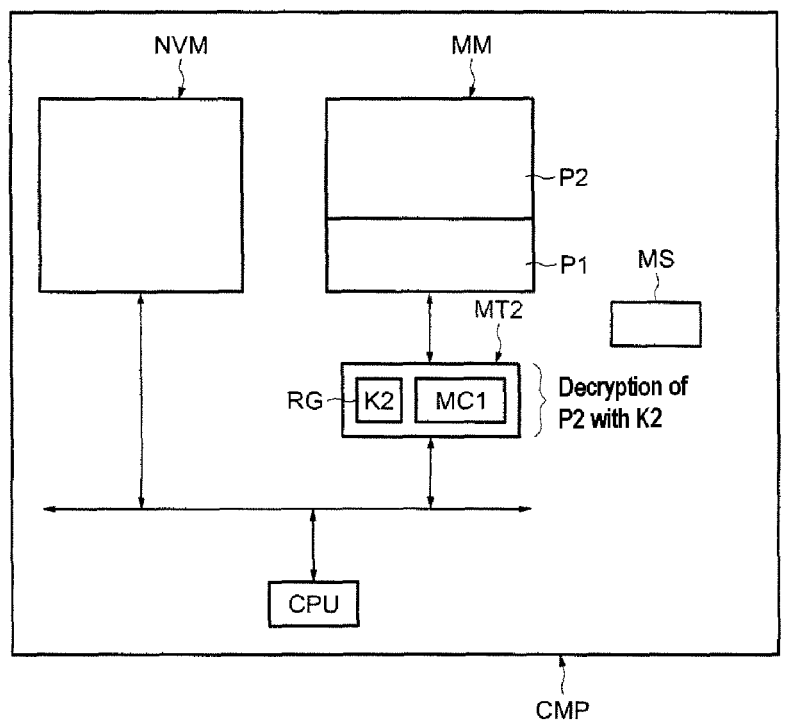

This is illustrated in FIG. 6 and the processing means then become second processing means MT2 decrypting the content of the second portion P2 of the memory MM with the key K2.

Although it is possible to use processing means MT2 that differ from the processing means MT1 which have been used with the key K1, in practice, and for reasons of simplification, the second processing means MT2 are structurally identical to the first processing means MT1. In other words, the decryption means MC1 use the same algorithm but with a different key.

In the mode of application that has just been described, the key K2 is stored in clear in the memory NVM.

Figure 7:
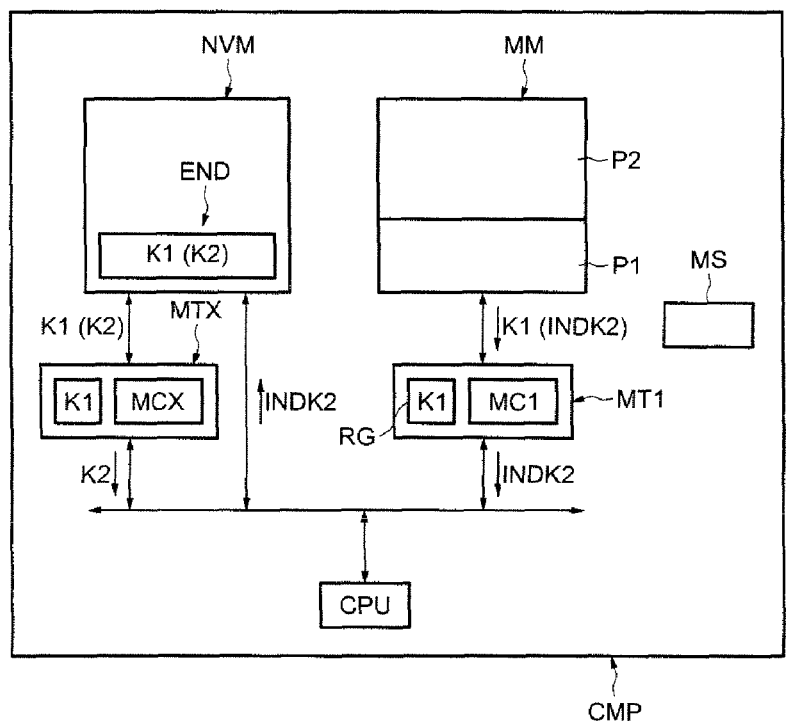
FIG. 7 illustrates schematically another embodiment and mode of application of the invention.

It would also be possible to envisage, as illustrated schematically in FIG. 7, that this key K2 is stored in a form encrypted by the key K1 in the location END.

In this case, auxiliary processing means MTX are for example provided that are structurally identical to the first processing means MT1 and in this respect comprise auxiliary decryption means MCX associated with a register containing the key K1.

Therefore, when the memory NVM is addressed by the indication INDK2 which has been decrypted by the first processing means MT1, the encrypted value K1 (K2) of the key K2 is extracted from the memory NVM and decrypted by the auxiliary processing means MTX using the key K1 so as to obtain in clear the key K2 which, as explained above, will finally be stored in the register RG in order to allow the decryption of the portion P2 of the memory MM.

Such a mode of application and embodiment is more secure since the key K2 is stored encrypted in the memory NVM.

In the embodiment that has been described, the processing means MT1 would comprise decryption means capable of using a decryption algorithm, for example of the AES or DES type. Such means are more robust with respect to security but they require several clock cycles of the clock signal running the CPU unit to decrypt the data.

Figure 8:
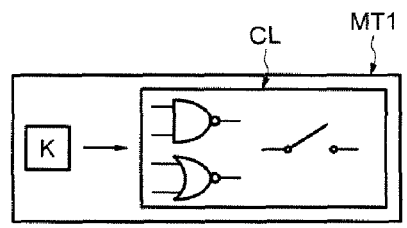
FIGS. 8 to 10 illustrate in greater detail but still schematically examples of structures of processing means of a component according to the invention.

Therefore, in certain applications, it can be envisaged to use, as illustrated in FIG. 8, processing means MT1 also capable of carrying out a decryption based on an encryption/decryption key K, but using, instead of a decryption algorithm, a logic circuit CL consisting of logic gates and switches. Such a circuit CL is consequently able to be configured, that is to say that its logic structure can be modified, based on the bits of the encryption/decryption key K. The bits of the key K are then commonly called configuration bits.

Such processing means on this occasion make it possible to decrypt an item of data in one cycle of the clock signal.

As a variant, the circuit CL may be configured so as to use an encryption/decryption logic function using a specific key as an input parameter. In this case, a portion of the bits of the key K can be used as configuration bits of the circuit CL and the remaining bits of the key K can form the said specific key.

Figure 9:
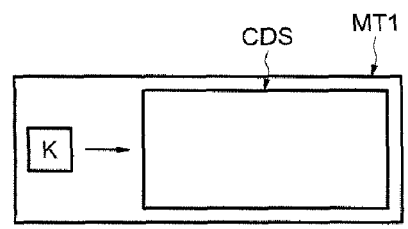

What has just been described for the encryption/decryption can also apply for scrambling and a descrambling operation. In this case, the entities are no longer encryption/decryption keys but scrambling keys. Note here that a scrambling operation of a digital word consists in changing the order of the bits of this word in the memory. In such an application, the processing means MT1 comprise on this occasion means CDS (FIG. 9) capable of carrying out a descrambling operation by using the scrambling key K.

Figure 10:
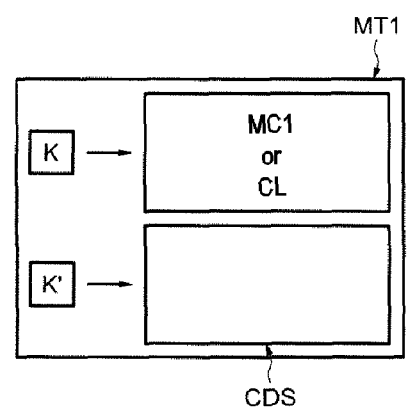

It is also possible to combine a scrambling operation and an encryption operation when contents are stored in the various memories. Consequently, when these stored contents are read, a descrambling operation and a decryption operation are carried out. The processing means MT1 then comprise, as illustrated in FIG. 10, decryption means, for example such as those referenced MC1 or such as those referenced CL, using an encryption/decryption key K and means capable of carrying out a descrambling operation CDS, such as those illustrated in FIG. 9, then using a scrambling key K'.

Figure 11:
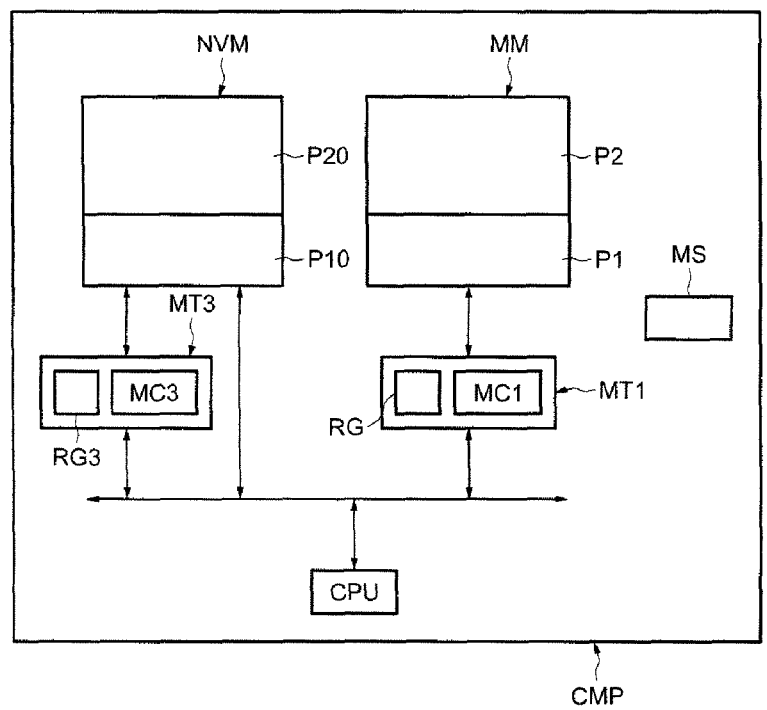
FIG. 11 illustrates schematically another embodiment of a component according to the invention.

FIG. 11 illustrates another possible embodiment of a component according to the invention.

Compared with the structure illustrated in FIG. 1, the component in this instance also comprises third processing means MT3 which are for example means capable of applying a decryption with the aid of an encryption/decryption key stored in the register RG3. These means MT3 may therefore be structurally identical to the processing means MT1.

Figure 12:
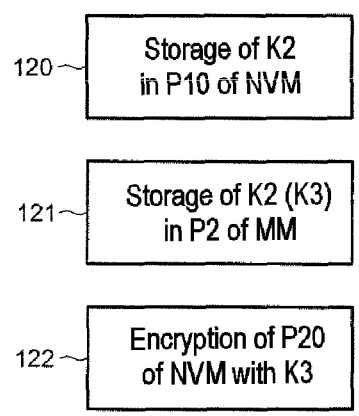
FIGS. 12 to 15 illustrate schematically another mode of application of a method according to the invention.

In this embodiment, the non-volatile memory NVM comprises a first portion P10 in which the key K2 is stored (step 120, FIG. 12). In this exemplary embodiment, the key K2 is stored in clear but it could equally be stored encrypted with the key K1 as indicated above.

Moreover, the memory NVM comprises a second portion P20 the content of which has been encrypted with a third encryption key K3 (step 122). This second portion P20 may therefore also comprise security data for the user, such as for example again a confidential code.

The encryption key K3 is stored (step 121, FIG. 12) in a form encrypted with the key K2 in the second portion P2 of the memory MM.

Figure 13:
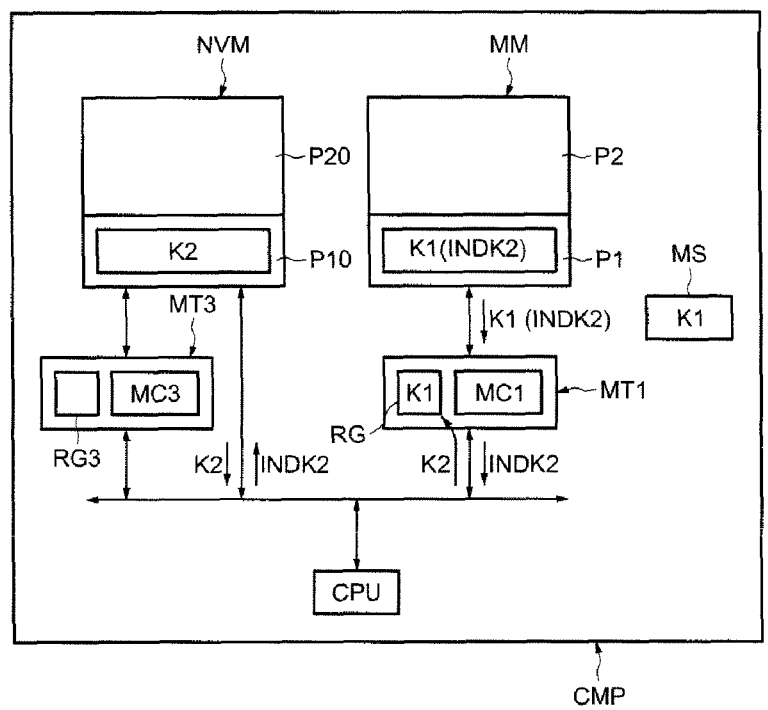

Therefore, in this mode of application, as illustrated in FIG. 13, when the component is powered up, the processing means MT1 begin to decrypt the content of the portion P1 of the memory MM with the key K1. Then, when the encrypted indication K1 (INDK2) is decrypted, this indication INDK2 allows the CPU unit to address the first portion P10 of the memory NVM so as to be able to extract therefrom the second encryption key K2 which will be finally stored in the register RG of the processing means MT1.

Then the processing means MT1 continue to decrypt the second portion P2 of the memory MM with the key K2.

Figure 14:
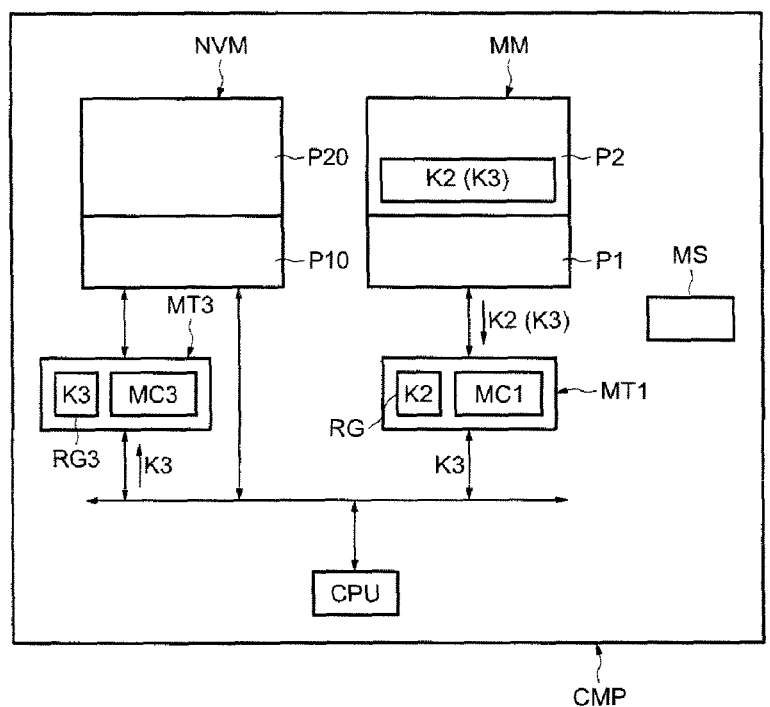
Figure 15:
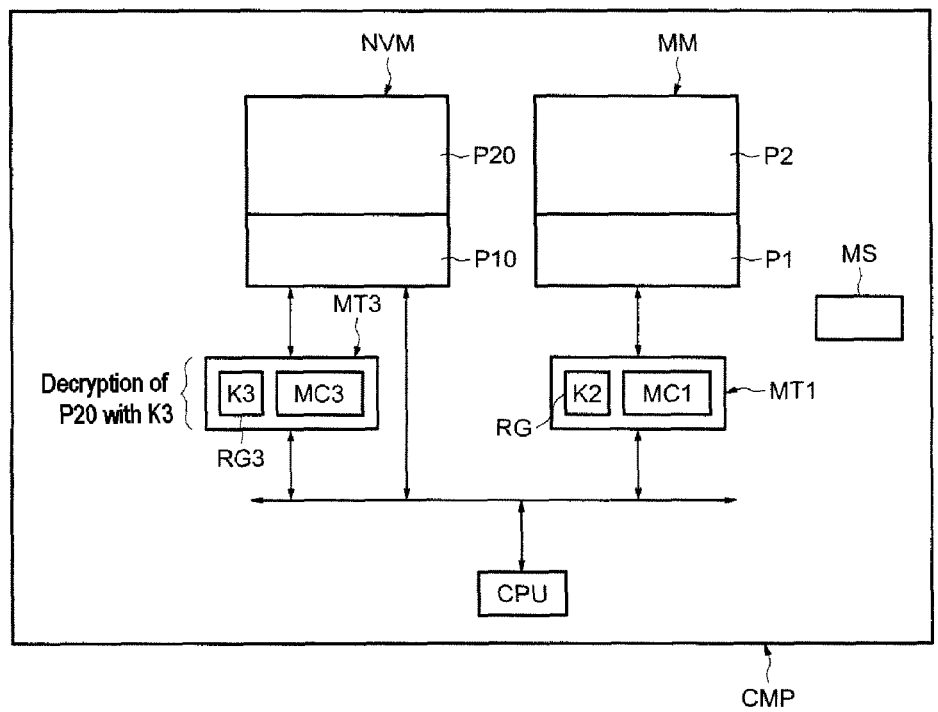

The key K3 encrypted with the key K2 is then decrypted by the processing means MT1 (FIG. 14) and the key K3 is then supplied to the processing means MT3, which, as illustrated in FIG. 15, will make it possible to decrypt the content of the portion P20 of the memory NVM with this key K3.

It can therefore be seen here that there is an embodiment and a mode of application that is highly secure because it uses in particular a crossed storage of the keys in the two memories MM and NVM with, what is more, certain of these keys encrypted.

Moreover, when the memory NVM is an EEPROM memory or a FLASH memory, it becomes extremely difficult to attack physically.

Figure 16:
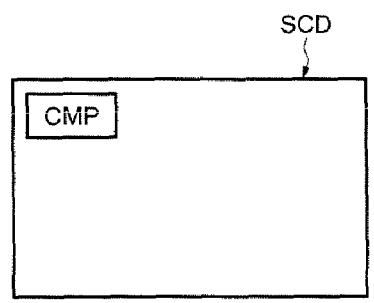
FIG. 16 illustrates schematically an embodiment of a smart card according to the invention.

Such a security component CMP may for example be incorporated into a smart card SCD as illustrated schematically in FIG. 16.

What is claimed is:

1. A method for processing content stored within a component, the component comprising a first memory and a non-volatile memory, the method comprising:

modifying a first content of a first portion of the first memory with a first entity;

modifying a second content of a second portion of the first memory with a second entity, wherein the first entity is different from the second entity;

storing the first entity secretly in a storage device of the component, the first entity having a secret value used to reset a protected register;

storing an item of entity information representative of the second entity in the non-volatile memory in a location designated by a first indication contained in the first portion of the first memory;

applying an inverse modification process to the first content of the first portion of the first memory using the first entity to obtain a first indication;

after the first indication is obtained with the inverse modification process, obtaining the second entity from the item entity information contained in the non-volatile memory;

applying an inverse modification process to the second content of the second portion of the first memory using the second entity the second entity.

2. A method for processing content stored within a component, the component comprising a first memory and a non-volatile memory, the method comprising:

modifying a first content of a first portion of the first memory with a first entity;

modifying a second content of a second portion of the first memory with a second entity, wherein the first entity is different from the second entity;

storing the first entity secretly in a storage device of the component, the first entity having a secret value used to resent s protected register; and storing an items of entity information representative of the second entity in the non-volatile memory in a location designated by a first indication contained in the first portion of the first memory, wherein the item of entity information representative of the second entity is the second entity.

3. The method according to claim 1, wherein the item of entity information representative of the second entity is the second entity modified with the first entity, and, after the first indication is obtained, an inverse modification process is applied to the item of entity information by using the first entity in order to obtain the second entity.

4. The method according to claim 1, wherein the non-volatile memory has a first portion in which the item of entity information is stored, and a second portion having a third content modified with a third entity, and wherein the third entity modified with the second entity is stored in the second portion of the first memory.

5. The method according to claim 4, wherein, after an inverse modification process has been applied to the second content by using the second entity to obtain the third entity, an inverse modification process is applied to the third content of the second portion of the non-volatile memory by using the third entity.

6. The method according to claim 4, wherein at least one of the first, second, and third entities comprises an encryption key and the inverse modification process associated with the at least one of the first, second, and third entities, comprises a decryption process.

7. The method according to claim 4, wherein at least one of the first, second, and third entities comprises a scrambling key and the inverse modification process associated with the at least one of the first, second, and third entities comprises a descrambling process.

8. The method according to claim 6, wherein at least one of the contents has been both encrypted with an encryption key and mixed with a scrambling key, and the inverse modification process associated with the at least one of the first, second, and third contents comprises a decryption process and a descrambling process.

9. A component comprising:

a first memory comprising a first portion having a first content modified with a first entity and a second portion having a second content modified with a second entity, wherein the first entity is different from the second entity;

a storage device configured to store the first entity secretly, the first entity having a secret value used to reset a protected register;

a non-volatile memory storing an item of entity information representative of the second entity in a location designated by a first indication contained in the first portion of the first memory;

a first processor configured to apply an inverse modification process to the first content of the first portion of the first memory;

a second processor configured to apply an inverse modification process to the second content of the second portion of the first memory; and a controller configured to activate first the first processor with the first entity, then to obtain, after an inverse modification process on the first content with the first entity, the second entity from the item of entity information contained in the non-volatile memory and to activate the second processor with the second entity.

10. A component comprising:

a first memory comprising a first portion having a first content modified with a first entity and a second portion having a second content modified with a second entity, wherein the first entity is different from the second entity;

a storage device configured to store the first entity secretly, the first entity having a secret value used to reset a protected register; and a non-volatile memory storing an item of entity information representative of the second entity in a location designated by a first indication contained in the first portion of the first memory; wherein the item of entity information representative of the second entity is the second entity.

11. The component according to claim 9, wherein the item of entity information is the second entity modified with the first entity, the component further comprising an auxiliary processor structurally identical to the first processor and configured to apply an inverse modification process to the item of entity information, wherein the controller is also capable, after having obtained the first indication, of activating the auxiliary processor with the first entity so as to obtain the second entity.

12. The component according to claim 9, wherein the first processor and the second processor are structurally identical.

13. The component according claim 9, wherein the non-volatile memory comprises a first portion configured to store the item of entity information, and a second portion having a third content modified with a third entity, the second portion of the first memory storing the third entity modified with the second entity.

14. The component according to claim 13, further comprising:

a third processor configured to apply an inverse modification process to the third content of the second portion of the non-volatile memory, wherein the controller is also capable of activating the third processor with the third entity delivered by the second processor.

15. The component according to claim 14, in which the third processor is structurally identical to the first processor and second processor.

16. The component according to claim 13, in which at least one of the first, second, and third entities comprises an encryption key and the processor associated with the at least one of the first, second, and third entities is configured to apply a key decryption algorithm.

17. The component according to claim 13, wherein at least one of the first, second, and third entities comprises an encryption key and the processor associated with the at least one of the first, second, and third entities comprises a logic circuit that can be structurally configured according to at least a portion of the encryption key.

18. The component according to claim 13, wherein at least one of the first, second, and third entities comprises a scrambling key and the processor associated with the at least one of the first, second, and third entities comprises an additional circuit configured to apply a descrambling operation.

19. The component according to claim 10, wherein the non-volatile memory is selected from the group consisting of a memory of an electrically programmable and erasable type, and FLASH memory.

20. A smart card containing a component according to claim 10.

21. A component, comprising:
- a first memory comprising a first portion having a first content modified with a first entity and a second portion having a second content modified with a second entity, wherein the first entity is different from the second entity;
- a storage device configured to store the first entity; and
- a non-volatile memory comprising a first portion and a second portion having a third content modified with a third entity, wherein the non-volatile memory stores the second entity in a location in the first portion of the non-volatile memory designated by a first indication contained in the first portion of the first memory, and wherein the second portion of the first memory stores the third entity, and the third entity is different from the first entity and the second entity.

22. The component of claim 21, further comprising:
- a first processor configured to apply an inverse modification process to the first content;
- a second processor configured to apply an inverse modification process to the second content;
- a third processor configured to apply an inverse modification process to the third content; and
- a controller configured to
  - activate first the first processor with the first entity,
  - then to obtain, after an inverse modification process on the first content with the first entity, the second entity contained in the first portion of the non-volatile memory,
  - activate the second processor with the second entity,
  - then to obtain, after an inverse modification process on the second content with the second entity, the third entity contained in the second portion of the first memory, and
  - activate the third processor with the third entity.

23. The component of claim 22, wherein the first portion of the non-volatile memory has a fourth content modified with the first entity, and the component further comprises:
- an auxiliary processor configured to apply an inverse modification process to the fourth content, wherein the controller is also capable, after having obtained the first indication, of activating the auxiliary processor with the first entity so as to obtain the second entity. entity so as to obtain the said second entity.

* * * * *

UNITED STATES PATENT AND TRADEMARK OFFICE
CERTIFICATE OF CORRECTION

PATENT NO. : 9,323,941 B2
APPLICATION NO. : 12/942557
DATED : April 26, 2016
INVENTOR(S) : Fabrice Marinet et al.

Page 1 of 1

It is certified that error appears in the above-identified patent and that said Letters Patent is hereby corrected as shown below:

In the Claims

In Col. 9, line 7, claim 1, delete "entity the second entity." and insert --entity.--.

In Col. 9, line 18, claim 2, delete "resent s" and insert --reset a--.

In Col. 10, line 56, claim 15, delete "in which" and insert --wherein--.

In Col. 10, line 59, claim 16, delete "in which" and insert --wherein--.

In Col. 12, lines 27 - 28, claim 23, delete "entity entity so as to obtain the said second entity." and insert --entity.--.

Signed and Sealed this
Nineteenth Day of July, 2016

Michelle K. Lee
*Director of the United States Patent and Trademark Office*